United States Patent [19]

Weber et al.

[11] 4,218,543

[45] Aug. 19, 1980

[54] RIM PROCESS FOR THE PRODUCTION OF ELASTIC MOLDINGS

[75] Inventors: Christian Weber, Cologne; Hermann Schafer, Leverkusen, both of Fed. Rep. of Germany

[73] Assignee: Bayer Aktiengesellschaft, Leverkusen, Fed. Rep. of Germany

[21] Appl. No.: 3,573

[22] Filed: Jan. 15, 1979

Related U.S. Application Data

[63] Continuation-in-part of Ser. No. 894,227, Apr. 7, 1978, abandoned, which is a continuation of Ser. No. 803,014, Jun. 3, 1977, abandoned, which is a continuation-in-part of Ser. No. 761,166, Jan. 21, 1977, abandoned.

[30] Foreign Application Priority Data

May 21, 1976 [DE] Fed. Rep. of Germany ....... 2622951

[51] Int. Cl.³ ..................... C08G 18/14; C08G 18/76; C08G 18/32
[52] U.S. Cl. ......................................... 521/51; 528/52; 528/53; 528/54; 528/57; 528/58; 528/67; 521/117; 521/125; 521/126; 521/127; 521/128; 521/129; 521/130; 521/131; 521/132; 521/160; 260/37 N; 264/45.5; 264/DIG. 83; 296/31 R
[58] Field of Search ......................... 521/51, 912, 914; 528/64; 252/182

[56] References Cited

U.S. PATENT DOCUMENTS

| | | | |
|---|---|---|---|
| T912,009 | 7/1973 | Strassel et al. | 264/45.5 |
| 3,408,301 | 10/1968 | Sundholm | 252/182 |
| 3,412,071 | 11/1968 | Sundholm | 260/75 NH |
| 3,428,610 | 2/1969 | Klebert | 528/64 |
| 3,583,926 | 6/1971 | Zwolinski et al. | 521/51 |
| 3,586,649 | 6/1971 | Cobbledick | 521/51 |
| 3,591,532 | 7/1971 | Abercrombie et al. | 521/51 |
| 3,655,597 | 4/1972 | Strassel | 521/51 |
| 3,728,310 | 4/1973 | Sundholm | 260/75 NH |
| 3,752,790 | 8/1973 | McShane et al. | 260/77.5 AM |
| 3,991,147 | 11/1976 | Knipp et al. | 260/2.5 AZ |
| 4,002,584 | 1/1977 | Takahashi et al. | 260/75 NH |
| 4,048,105 | 9/1977 | Salisbury | 521/51 |

*Primary Examiner*—H. S. Cockeram
*Attorney, Agent, or Firm*—Gene Harsh; Joseph C. Gil; R. Brent Olson

[57] ABSTRACT

The instant invention relates to a one-step process for the production of elastomeric moldings which have a compact surface by the technique of reaction injection molding, using highly reactive systems of specific polyisocyanates, polyhydroxyl compounds and specific active aromatic polyamines. The instant invention further relates to active hydrogen containing blends useful in preparing elastomeric moldings, said blends comprising polyhydroxyl compounds, and specific active aromatic diamines. The blends herein may also contain catalyst for the reaction between hydroxyl groups and isocyanate groups.

46 Claims, No Drawings

RIM PROCESS FOR THE PRODUCTION OF ELASTIC MOLDINGS

CROSS-REFERENCE TO RELATED U.S. APPLICATIONS

This is a continuation-in-part of U.S. application Ser. No. 894,227, filed on Apr. 7, 1978, which is a continuation of application Ser. No. 803,014 filed June 3, 1977, which application is a continuation-in-part of U.S. application Ser. No. 761,166, filed on Jan. 21, 1977, all now abandoned.

BACKGROUND OF THE INVENTION

The production of moldings having a compact surface by the isocyanate polyaddition process is known in principle. It may be carried out, for example, by introducing a reactive and, if desired, also foamable mixture based on compounds having several reactive hydrogen atoms and polyisocyanates into a mold (see, for example, German Auslegeschrift No. 1,196,864). The compounds having reactive hydrogen atoms used are mainly polyethers and polyesters having hydroxyl groups. Examples of suitable polyisocyanates include tolylene-2,4- and -2,6-diisocyanates and isomeric mixtures thereof, as well as polyphenylpolymethylene polyisocyanates obtained by a process of anilineformaldehyde condensation followed by phosgenation. Water and/or fluorinated hydrocarbons, for example, may be used as blowing agents. The catalysts known for the production of polyurethanes are generally also used.

With suitable choice of the starting components (other substances, e.g. chain lengthening agents, such as glycols or diamines, may also be used) it is possible by this process to obtain both elastic products and rigid products, as well as variations between these extremes.

Systems which contain diamines as chain lengthening agents cannot generally be processed by a one-shot process. In these cases, a prepolymer containing isocyanate groups must first be prepared. This prepolymer is then reacted with the diamine in a second step to yield the high molecular weight elastomer (German Auslegeschrift No. 1,240,654).

For molded products which will be subjected to severe stresses in use, only slightly branched starting materials which give rise to products with elastomer-like properties are generally used. Moldings of this type have long been in production on a commercial scale (e.g. as shoe soles for the shoe industry). Large moldings have lately come into use in the automotive industry.

Processing of the raw materials to produce automotive body parts is primarily carried out by the so-called "reaction injection molding process" (RIM). This process involves a technique of filling the mold by which highly reactive, liquid starting components are injected into the mold within a very short time by means of high output, high pressure dosing apparatus after they have been mixed in so-called "positively controlled mixing heads."

The RIM process is widely known and a detailed description of the technology thereof may be found, for example, in the following references:

| | |
|---|---|
| Piechota/Rohr: | "Integralschaumstoffe" Carl Hanser-Verlag, Munich/Vienna, 1975; |
| Prepelka/Wharton: | "Reaction Injection Molding in the Automotive Industry", Journal of Cell. Plastics, Vol. II. No. 2, 1975; |
| Knipp: | "Plastics for Automobile Safety Bumpers", Journal of Cell. Plastics, No. 2, 1973. |

The reaction injection molding technique may be used for producing large moldings weighing from 3 to 10 kg or more, such as the flexible car body parts also known in the motor industry as "soft face elements", i.e. reversibly shaped front and rear parts of motor vehicles.

The following technical advance is generally achieved by the RIM procedure: large quantities of two liquid, highly reactive starting materials are delivered mechnically within a very short time (from about 2 to 4 seconds) and mixed at the same time and introduced into a mold in which the mixture is cured to yield the finished product within a time (from 1 to 2 minutes) which is also very short for polyurethane materials.

Realization of this new technology required a solution to the following three problems:

1. In view of the high reactivity of the two starting components (polyisocyanates and compounds which are reactive with polyisocyanates), the reaction mixture must be introduced into the mold within the shortest possible time which should not exceed the cream time (i.e., the time between mixing of the reactants and the first visible signs of a chemical reaction). This necessitated the development of highly efficient axial and radial piston pumps which when installed in high pressure machines were capable of delivering at a rate of from 2.5 to 6.5 kg/second. Machines of this type have been described, for example, in German Offenlegungsschriften No. 1,778,060 and No. 2,146,054.

2. Production of a faultless molding required not only exact dosing of the two components to keep them at a particular ratio prescribed by the given formulation over the whole period of injection, but also required intimate mixing of the components from the first to last drop. Perfect mixing is made enormously difficult by the fact that due to their high flow velocities, the two components have only a very short residence time in the mixing chamber of the mixing head. This problem could be solved by using so-called "positively controlled mixing heads" which operate on the principle of "counterflow injection" (see e.g., U.S. Pat. No. 3,709,640 and No. 3,857,550, and German Offenlegungsschriften No. 2,007,935 and No. 2,364,501).

3. When the reaction mixture enters the closed mold, it almost instantly displaces the air contained in it. To ensure that this does not lead to inclusions of air in the reaction mixture and hence faults in the end product, the liquid streaming into the mold must, in effect, "push" the air forward in front of it in the form of a "flow front" and expel it through predetermined slots. To ensure complete absence of turbulence during filling of the mold, the material must enter the mold over a wide front along the wall of the mold in a laminar stream. This has been achieved by developing a certain technique of injection through so-called "film gates" described in German Offenlegungschriften No. 2,348,658 and No. 2,348,608.

U.S. Pat. No. 3,655,597 broadly discloses reacting polyisocyanate, polyol, blowing agent, diamine, and catalyst. The reference suggests the use of polymethylene diisocyanates and aromatic diisocyanates such as tolylene diisocyanate as possible isocyanates. The reference suggests aromatic diamines containing no negative group in the ortho-position to the amino group. Phenylene diamines and tolylene diamines are mentioned in the list of possible diamines fitting this description. The reference specifically discloses 3,3'-dichloro- 4,4'-diaminodiphenylmethane (MOCA) and a mixture of MOCA and o-tolylenediamine (TDA). However, the use of TDI and MOCA is too slow for practical use in a RIM system and the use of TDA as a chain extender causes the mixture to react so fast that it sets before it can be poured into a mold. Furthermore, TDA has only a limited compatibility with polyether polyols so that it can only be used in relatively small quantities. Even if small quantities are used, care must be taken that the chain extender does not crystallize.

Abandoned U.S. Pat. application No. 672,694 which was incorporated by reference in column 2, line 18, of U.S. Pat. No. 3,655,597 discloses tolylenediamine (TDA) in combination with polymethylene polyphenylisocyanate in the Examples. As mentioned, the mixture containing TDA reacts too fast to be poured into a mold. TDA also has a very limited compatibility with polyether polyols so that it can only be used in relatively small quantities. Even with small quantities care must be taken so that the TDA does not crystallize.

Defensive Publication No. T 919,009-Strassel et al suggests a process of reacting polyisocyanate, polyol, poly- amines or amino alcohols, foaming agent, and catalyst. TDI and MOCA are disclosed. As noted above, the use of TDI and MOCA is too slow for practical use in a RIM system. The polyisocyanates suggested in the Strassel reference include (page 5, lines 23 and 24) toluene diisocyanate, diphenylmethane diisocyanate, polymethylenepolyphenyl isocyanate, and mixtures thereof. TDI and MDI are used alone and as a prepolymer blend. The reference discloses MOCA, dichlorobenzidine, and a mix of MOCA and metaphenylene diamine as the chain extender. On page 6, lines 13 and 14, of the application of the Defensive Publication, dichlorobenzidine is described in the same class as MOCA. The use of MOCA results in too slow a setting time for practical use in a RIM system.

U.S. Pat. No. 3,586,649 suggests foam mixtures comprising polyisocyanate, polyol, aryl diamines, blowing agent and catalyst. Column 12, line 24, lists diphenylmethane-4,4'-diisocyanate in its long list of possible isocyanates. TDI and MDI are disclosed as possible isocyanates. Four classes of aryl diamines are suggested. The four classes are represented by general formulas, none of which read on the special diamines of the instant invention. MOCA is disclosed as the chain extender.

U.S. Pat. No. 3,752,790 is directed to chlorinated toluene diamines as curing agents. In column 7, Tables I and II, the reference indicates that chlorinated toluene diamines have longer demolding times than generally used curing agents. The Tables record times of 15 to 20 minutes and 25 to 30 minutes. MDI and TDI are disclosed as possible isocyanates to use with the chlorinated toluene diamines.

U.S. Pat. No. 4,002,584 is directed to halogenated diamino diphenylmethanes as chain extenders. MDI and TDI are disclosed as possible isocyanates.

U.S. Pat. No. 3,583,926 discloses the use of sterically hindered aromatic polyamines and a MOCA-type diamine. U.S. Pat. No. 3,591,532 also discloses MOCA-type diamines.

DESCRIPTION OF THE INVENTION

The present invention is directed to a process for the production of elastomeric moldings having a compact surface from polyurethane-polyurea elastomers based on:

(a) 4,4'-diisocyanatodiphenylmethane and polyisocyanates based on 4,4'-diisocyanatodiphenylmethane;

(b) hydroxyl group containing compounds having a molecular weight of from 1800 to 12,000 and preferably containing at least two primary hydroxyl groups;

(c) active aromatic amines as chain lengthening agents;

(d) catalysts for the reaction between hydroxyl groups and isocyanate groups; and (e) optionally blowing agents, auxiliary agents and/or additives known in polyurethane chemistry; which process is characterized in that the chain lengthening agents (c) used in the process are miscible with component (b) in any proportion and are active aromatic diamines having alkyl groups of from 1 to 3 carbon atoms in the ortho positions to each amino group, and in that components (a) to (e) are processed as a one-shot system by the reaction injection molding technique. As is known in the art in the "one-shot" system, the various components are mixed simultaneously as opposed to the prepolymer process, wherein some of the components are prereacted. Optionally, the components non-reactive with each other may first be blended and thereafter processed in a "one-shot" technique.

The present invention also is directed to a process for the production of elastomeric moldings having a compact surface from a reaction mixture by a reaction injection molding process, wherein said reaction mixture comprises the following components:

(a) 4,4'-diisocyanatodiphenylmethane and polyisocyanates based on 4,4'-diisocyanatodiphenylmethane;

(b) hydroxyl group containing compounds, preferably having a molecular weight of from 1800 to 12,000, most preferably 3,000 to 7,000 and preferably containing at least two primary hydroxyl groups;

(c) a chain extender; and (d) a catalyst for the reaction between hydroxyl groups and isocyanate groups; and (e) optionally blowing agents, auxiliary agents and/or additives known in polyurethane chemistry; which process is characterized in that the chain extender (c) used in the process is miscible with component (b) in any proportion and is selected from the group consisting of active aromatic diamines which contain at least one alkyl group in the o-position to a first amino group and two alkyl substituents in the o-position to a second amino group, and mixtures thereof provided that at least two of said three alkyl groups contain at least two carbon atoms, and wherein said components (a) to (e) are processed as a one-shot process whereby (a) is mixed simultaneously either with (b), (c), and (d) or with a non-reacted premixture of some or all of (b), (c), (d) and (e). As is known in the art in the "one-shot" system, the reactive components are mixed simultaneously as opposed to the prepolymer process, wherein some of the components are prereacted. Thus, the components non-reactive with each other may first be blended and thereafter processed in a "one-shot" technique.

It has now surprisingly been found that even extremely highly reactive one-shot mixtures (with flow times of less than thirty seconds) of specific active polyisocyanates, specific active aromatic polyamines, polyhydroxyl compounds containing primary hydroxyl groups and strong catalysts may be processed by the RIM method. In these mixtures, transition from the liquid to solid phase is almost instantaneous so that the liquid reaction mixture solidifies along the walls of the mold.

The most surprising aspect of this method is that, in spite of the short times of reaction, it is still possible to fill complicated mold cavities having a large volume and thin walls (wall thickness less than 3 mm). It appears that under these circumstances liquid material is still forced through the space between the solidified surfaces of the molding on the walls of the mold and fresh material continues to be delivered under the filling pressure of the machine until the end of the filling process. This would explain how it is possible to produce heavier moldings than would appear to be mathematically possible from a comparison of the cream time with the filling time (at the given rate of filling per second). In this way the filling time may exceed the cream time by up to 50%.

Solidification of the whole reaction mixture after injection again takes place so rapidly that if highly reactive mixtures are used the mold may be opened after less than 30 seconds to remove the molded product.

For commercial application of the invention, it is necessary that the reaction mixture remain fluid for a sufficient length of time to pour the mixture into the mold. It was found that where a diaminotoluene (TDA) or dimethyl toluene amine (DMTA) was used as the sole chain extender that the mixture solidified before it could be poured. These chain extenders could be used, however, in admixture with the chain extenders used in the instant invention as long as the major portion of chain extender is that of the instant invention.

It is also necessary for commercial application that the reaction mixture hardens into a molding rapidly after being placed in the mold. The advantage of the instant invention is that numerous moldings can be made in a short period of time. The moldings produced in accordance with the instant invention can be demolded in about thirty seconds after injection into the mold. It was found that when 3,3'-dichloro-4,4'-diaminodiphenylmethane (MOCA) was used as the chain extender the demolding time was about 15 minutes which would make its use commercially impractical. It was also found that when tolylene diisocyanate (TDI) was used as the sole isocyanate the demolding time was about 5 minutes and the resultant molding had no "green strength". It was thus found that a commercially practical reaction injection molding process could be attained when the majority of the chain extender and isocyanate are those recited in the instant invention.

Another decisive advantage of these new systems is that significantly less external mold release agent need be applied to assist removal of products from metal molds since the end products have self-releasing properties. This is presumably also due to the fact that the reaction mixture undergoes quasi-solidification on the walls of the mold and there is therefore less reaction between the isocyanate groups and the metal surface.

There is no technique other than reaction injection molding which could conceivably control such reactive systems, i.e. deliver the starting components within the very short times mentioned above, mix them and ensure the production of a perfect molding which may be removed from the mold after a period of time which is uncommonly short for polyurethanes.

The combination of the novel one-shot system to be described hereinafter with this technology of the reaction injection molding process therefore has several important advantages over the conventional injection molding technique in which thermoplastic granulates are molded by a physical process of melting and resolidification with the application of high temperatures (from 150° to 200° C.) and high pressures (about 2000 bar) and, in the case of large molded articles, using enormous machines. These advantages may be enumerated as follows:

(1) liquid starting materials; hence,
(2) the possibility of easy dosing;
(3) processing at temperatures less than 38° C.;
(4) low internal mold pressure; (less than 2 bar);
(5) very brief molding times (from 5 to 60 seconds, depending on the geometry of the mold); and,
(6) as a result of (1), (2) and (4), only about 40% of the capital investment required for mechanical equipment.

The instant invention is further directed to a novel active hydrogen containing blend for use in production of elastomeric moldings comprising hydroxyl containing compounds and active aromatic amines. The polyhydroxyl compounds preferably have molecular weights of from 1,800 to 12,000 and most preferably contain at least two primary hydroxyl groups. The novel blends disclosed herein may also contain catalysts for the reaction between hydroxyl groups and isocyanate groups.

According to an earlier proposal (German Offenlegungsschrift No. 2,513,817), mixtures of higher molecular weight polyhydroxyl compounds, butane-1,4-diol or ethylene glycol as chain-lengthening agent, polyisocyanates and optionally blowing agents are processed to produce molded articles by the method of the reaction injection molding process. Compared with the products produced according to German Offenlegungsschrift No. 2,513,817, the molded products produced according to the present invention have distinctly better mechanical properties. In particular the modulus of elasticity depends very little on the temperature (sufficient rigidity in heat and flexibility at low temperatures).

It is known that the elastomeric properties are improved in any given system if glycol chain lengthening agents are replaced by aromatic diamines, however, the one-shot process may be employed only in exceptional cases. If very inert diamines are used in which the reactivity of the amino groups towards isocyanates has been greatly reduced by electron attracting substituents, aromatic diamines may be used. Diamines of this type include, e.g. 3,3'-dichloro-4,4'-diamino-diphenylmethane, o-dichlorobenzidine and 2,5-dichloro-1,4-phenylenediamine (see, e.g. British Pat. No. 981,935).

As a general rule, but especially in the case of the more reactive polyamines, the components must be reacted together in two or more stages (prepolymer process) because of the highly differing reactivities of polyols and polyamines towards isocyanates. It was therefore not to be foreseen that it would be at all possible to carry out the one-step process according to the present invention which uses not only polyamines whose reactivity towards isocyanates is not checked, but also very strong catalysts for the polyaddition reaction. It was rather to have been expected that the mixing apparatus would immediately foul-up with polymer products because of the rapid reaction or that at the very least, the reaction products obtained would be non-homogeneous due to the preferential reaction between polyisocyanates and polyamines. As may be seen from the Examples, however, it is surprisingly found that this was not the case.

The polyisocyanates used as starting components (a) according to the present invention are 4,4'-diisocyanatodiphenylmethane and polyisocyanates based on 4,4'-diisocyanatodiphenylmethane. This would include the polyphenylpolymethylene polyisocyanates which may be obtained by aniline-formaldehyde condensation followed by phosgenation. From a practical standpoint, it is preferred that the isocyanate be liquid at room temperature.

The presently preferred starting components (a) are liquid polyisocyanates having urethane groups, which may be obtained (e.g. as described in German Offenlegungsschrift No. 1,618,380) by reacting 1 mol of 4,4'-diisocyanatodiphenylmethane with from 0.05 to 0.3 mols of low molecular weight diols or triols, preferably with polypropylene glycols having a molecular weight below 700, or diisocyanates having carbodiimide and/or uretoneimine groups based on diphenylmethane diisocyanate, which are obtainable according to U.S. Pat. No. 3,152,162. Mixtures of the last-mentioned preferred polyisocyanates are also highly useful.

The compounds used as component (b) in the process according to the present invention are preferably polyhydroxy materials having molecular weights of from 1800 to 12,000, and most preferably from 3000 to 7000. Polyethers are suitable for the process of the present invention. Preferred are those having at least 2, and preferably 2 or 3 hydroxyl groups are known and may be prepared, e.g. by polymerization of epoxides, such as ethylene oxide, propylene oxide, butylene oxide, tetrahydrofuran, styrene oxide or epichlorohyrin, either on their own, e.g. in the presence of $BF_3$, or by a process of chemical addition of these epoxides, optionally as mixtures or successively, to starting components having reactive hydrogen atoms, such as water, ammonia, alcohols, or amines. Examples of suitable starting components include ethylene glycol, propylene glycol-(1,3) or -(1,2), trimethylolpropane, 4,4'-dihydroxy-diphenylpropane, aniline, ethanolamine or ethylene diamine. Sucrose polyethers which have been described in German Auslegeschriften No. 1,176,358 and No. 1,064,938 may also be used according to the present invention. It is in many cases preferred to use polyethers which contain predominant amounts of primary OH groups (up to 90%, by weight, based on all the OH groups present in the polyether). Polyethers modified with vinyl polymers are also suitable. These may be obtained, for example, by the polymerization of styrene and acrylonitrile in the presence of polyethers (U.S. Pat. Nos. 3,383,351; 3,304,273; 3,523,093 and No. 3,110,695; and German Pat. No. 1,152,536). Polybutadienes having OH groups may also be used.

According to the present invention, however, there may also be used polyhydroxyl compounds which contain high molecular weight polyadducts or polycondensates in a finely dispersed form or in solution. Such modified polyhydroxyl compounds are obtained when polyaddition reactions (e.g. reactions between polyisocyanates and amino functional compounds) or polycondensation reactions (e.g. between formaldehyde and phenols and/or amines) are directly carried out in situ in the above-mentioned hydroxyl compounds. Processes for the production of this type of material have been described in German Auslegeschriften No. 1,168,075 and No. 1,260,142 and in German Offenlegungsschriften Nos. 2,324,134; 2,423,984; 2,512,385; 2,513,815; 2,550,796; 2,550,797; 2,550,833 and No. 2,550,862. Such polyhydroxyl compounds may also be obtained according to U.S. Pat. No. 3,869,413 or German Offenlegungsschrift No. 2,550,860 by mixing an aqueous polymer dispersion with a polyhydroxyl compound and then removing water from the mixture.

According to the present invention, hydroxyl-containing polyesters, polythioethers, polyacetals, polycarbonates or polyester amides of the type known for the production of both homogeneous and cellular polyurethanes may also be used instead of or together with polyether polyols.

Suitable polyesters containing hydroxyl groups include, reaction products of polyhydric, (preferably dihydric alcohols,) optionally with the addition of trihydric, alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or may be unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and terephthalic acid-bis-glycol esters. The following are examples of suitable polyhydric alcohols: ethylene glycol, propylene glycol-(1,2) and -(1,3), butylene glycol-(1,4) and -(2,3), hexanediol-(1,6), octanediol-(1,8), neopentylglycol, cyclohexanedimethanol (1,4-bis-hydroxy-methylcyclohexane), 2-methyl-1,3-propane-diol, glycerol, trimethylolpropane, hexanetriol-(1,2,6), butanetriol-(1,2,4), trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, such as $\epsilon$-caprolactone, or hydroxycarboxylic acids, such as $\omega$-hydroxycaproic acid, may also be used.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio-mixed ethers, polythio-ether esters or polythio-ether ester amides, depending on the co-components.

Suitable polyacetals include, for example, the compounds which may be prepared from glycols, such as diethylene glycol, triethylene glycol, 4,4'-dioxethoxydiphenyl dimethyl-methane and hexanediol, and formaldehyde. Suitable polyacetals for the purpose of the present invention may also be prepared by the polymerization of cyclic acetals.

The polycarbonates containing hydroxyl groups used may be of the type known. Highly useful are those which may be prepared by the reaction of diols, such as propanediol-(1,3), butanediol-(1,4) and/or hexanediol-(1,6), diethylene glycol, triethylene glycol or tetraethylene glycol, with diarylcarbonates, e.g. diphenylcarbonate, or phosgene.

Suitable polyester amides and polyamides include, for example, the predominantly linear condensates prepared from polybasic saturated and unsaturated carboxylic acids or the anhydrides thereof and polyvalent saturated or unsaturated amino alcohols, diamines, polyamines and mixtures thereof.

Representatives of the hydroxyl functional compounds which may be used according to the present invention are generally known and have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich, 1966, on pages 45 to 71.

In the process according to the present invention, component (b) preferably consists solely of the classical polyether polyols of polyurethane chemistry having molecular weights of from 1800 to 12,000, preferably from 3000 to 7000, and containing two or most preferably three hydroxyl groups. Mixtures of polyethers having two or three hydroxyl groups are preferred.

Chain lengthening agent (c) which is essential to the present invention may be selected from the group consisting of active aromatic diamines, which contain at least one alkyl substituent in the ortho-position to a first amino group and two alkyl substituents in the ortho-position to a second amino group or mixtures thereof, preferably with the proviso that at least two of said alkyl substituents contain at least two carbon atoms. By "active" diamines and polyamines are meant those whose reactivity towards isocyanates has not been reduced by electron attracting substituents, such as halogen, ester, ether or disulphide groups, as is the case, for example, with methylene-bis-chloroaniline (MOCA). Also excluded from the term "active" are amines which contain other functional groups reactive with isocyanates. Chain extender (c) is generally used in the process according to the present invention in quantities of from 5 to 50% by weight, preferably from 5 to 35% by weight, and most preferably from 8 to 35% by weight, based on component (b).

Alkylated aromatic amines are known, see for example U.S. Pat. Nos. 3,862,233; 2,814,646; 3,649,693; 3,678,112; and No. 3,678,113. As is suggested by these patents, the alkyl substituent can have as many as twenty carbon atoms. Likewise in the instant invention, the alkyl substituents may be straight or branched long chains.

Liquid or dissolved aromatic amines which have proved to be particularly suitable for the process according to the present invention are those which contain at least one alkyl substituent in the ortho-position to a first amino group and two alkyl substituents having from 1 to 3 carbon atoms in the ortho-position to a second amino group, provided that two of these alkyl substituents contain two or three carbon atoms. Examples include: 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and the like.

The above-mentioned active aromatic amines may, of course, be used as mixtures with each other or in combination with other active aromatic amines, provided a majority of the amine is of the type described.

It is also particularly preferred to use aromatic diamines which have a linear alkyl substituent having from 1 to 3 carbon atoms in both ortho-positions to each amino group, provided that two of the alkyl substituents contain two or three carbon atoms. For processing by the RIM process, it is generally preferred that the diamine be liquid at room temperature and miscible with polyhydroxyl compounds in any proportion, particularly with polyhydroxypolyethers. Particularly preferred in this connection is the compound 1-methyl-3,5-diethyl-2,4-diaminobenzene or a mixture of this compound with 1-methyl-3,5-diethyl-2,6-diaminobenzene.

In cases where the amines used are crystalline at room temperature, they must be dissolved in the polyhydroxyl compounds and the subsequent reaction by the RIM process may, if necessary, be carried out at elevated temperatures (up to approximately 50° C.) for the purpose of reducing the viscosity of the mixture.

Catalysts (d), which are also essential to the present invention and without which it is not possible to obtain a molding which sets rapidly in the mold and has technologically interesting mechanical properties, are preferably selected from the group of organic metal compounds known for use in polyurethane chemistry. According to the present invention, it is preferred to use organic tin compounds such as tin (II) salts of carboxylic acids, (such as tin (II) acetate, tin (II) octoate, tin (II) ethyl hexoate or tin (II) laurate), and the dialkyl tin salts of carboxylic acids, (such as dibutyl tin diacetate, dibutyl tin dilaurate, dibutyl tin maleate or dioctyl tin diacetate,) either alone or most preferably as a complex with amidines, such as 2,3-dimethyl-3,4,5,6-tetrahydropyrimidine or 2-methyl-3-cyclohexyl-3,4,5,6-tetrahydropyrimidine, aminopyridines, aminopyrimidines, hydrazino pyridines or hydrazino pyrimidines. Synergistically acting catalyst combinations of this type are known and have been described, for example, in German Offenlegungsschriften Nos. 2,434,185; 2,601,082 and No. 2,603,834.

Other catalysts which may be used include: known tertiary amines, such as triethylamine, tributylamine, N-methylmorpholine, N-ethylmorpholine, N-cocomorpholine, N,N,N',N'-tetramethyl-ethylenediamine, 1,4-diaza-bicyclo-(2,2,2)-octane, N-methyl-N'-dimethylaminoethyl-piperazine, N,N-dimethylbenzylamine, bis-(N,N-diethylamino-ethyl)-adipate, N,N-diethylbenzylamine, pentamethyl-diethylene-triamine, N,N-dimethylcyclohexylamine, N,N,N',N'-tetramethyl-1,3-butanediamine, N,N-dimethyl-β-phenylethylamine, 1,2-dimethylimidazole and 2-methylimidazole. A preferred catalyst of this type is 1,4-diaza-bicyclo-(2,2,2)-octane.

Tertiary amines having isocyanate-reactive hydrogen atoms include, e.g. triethanol-amine, triisopropanolamine, N-methyl-diethanolamine, N-ethyl-diethanolamine, and N,N-dimethyl-ethanolamine may also be used. Reaction products of these compounds with alkylene oxides, such as propylene oxide and/or ethylene oxide are also suitable.

Silaamines having carbon-silicon bonds as described, e.g. in German Pat. No. 1,229,290 may also be used as catalysts. Examples include 2,2,4-trimethyl-2-silamorpholine or 1,3-diethylaminomethyl-tetramethyl-disiloxane.

Basic nitrogen compounds, such as tetraalkylammonium hydroxides, alkali metal hydroxides such as sodium hydroxide, alkali metal phenolates, such as sodium phenolate, and alkali metal alcoholates, such as sodium methylate, may also be used as catalysts. Hexahydrotriazines are also suitable catalysts.

The above-mentioned catalysts may be used alone, (e.g. most preferably 1,4-diaza-bicyclo-(2,2,2)-octane) or in combination with organic metal compounds, and in particular the organic tin compounds noted above.

Other representatives of catalysts which may be used according to the present invention and details concerning the action of the catalysts may be found, e.g., in Kunststoff-Handbuch, Volume VII, published by Vieweg and Hochtlen, Carl-Hanser-Verlag, Munich 1966, pages 96 to 102.

The catalysts are generally used in a quantity of from about 0.01 to 10% by weight, and preferably from 0.05 to 1% by weight, based on the quantity of compounds (b).

The catalysts to be used according to the present invention should accelerate the polyaddition reaction to such an extent that once the starting components have been mixed the reactive mixture has a flow time (e.g., the capability to flow and hence the time during which the mixture may still be delivered) of less than 5, 10, or 15 seconds, and demolding times of less than 30 seconds.

The process according to the present invention is preferably used for producing compact moldings although blowing agents may also be used, in which case moldings having a compact surface and cellular interior are obtained. The blowing agents (e) used may be water and/or readily volatile organic substances and/or dissolved inert gases. Suitable organic blowing agents include, e.g. acetone; ethyl acetate; methanol; ethanol; halogen substituted alkanes, such as methylene chloride, chloroform, ethylidene chloride, vinylidene chloride, monofluorotrichloromethane, chlorodifluoromethane or dichlorodifluoromethane; butane; hexane; heptane; diethyl ether; and the like. Suitable inert gases include nitrogen, air, carbon dioxide, and the like.

The effect of a blowing agent may also be obtained by adding compounds which decompose at temperatures above room temperature to liberate gas, for example, nitrogen. Examples include azo compounds, such as azoisobutyric acid nitrile. Other examples of blowing agents and details concerning the use of blowing agents may be found in Kunststoff-Handbuch, Volume VII, published by Vieweg and Hochtlen, Carl-Hanser-Verlag, Munich 1966, pages 108 and 109, 453 to 455 and 507 to 510.

Surface-active additives (emulsifiers and foam stabilizers) may also be used according to the present invention. Suitable emulsifiers include the sodium salts of ricinoleic sulphonates or of fatty acids, or salts of fatty acids with amines, such as oleic acid diethylamine or stearic acid diethanolamine. Alkali metal or ammonium salts of sulphonic acids, such as dodecylbenzene sulphonic acid or dinaphthylmethane disulphonic acid, or of fatty acids, such as ricinoleic acid, or of polymeric fatty acids may also be used as surface active additives.

The most useful foam stabilizers are primarily water-soluble polyether siloxanes. These compounds generally have a polydimethylsiloxane group attached to a copolymer of ethylene oxide and propylene oxide. Foam stabilizers of this type are known and have been described, for example, in U.S. Pat. No. 2,764,565.

Known cell regulators, such as paraffins or fatty alcohols or dimethylpolysiloxanes, pigments, dyes, known flame retarding agents, such as bis-chloroethylphosphate or ammonium phosphate and polyphosphate, stabilizers against ageing and weathering, plasticizers, fungistatic and bacteriostatic substances and fillers, such as barium sulphate, kieselguhr, carbon black or whiting, may also be used according to the present invention.

Other examples of surface active additives, foam stabilizers, cell regulators, stabilizers, flame retarding substances, plasticizers, dyes, fillers and fungistatic and bacteriostatic substances which may be used according to the present invention and details concerning the use and action of these additives are known and may be found in Kunststoff-Handbuch, Volume VI, published by Vieweg and Hochtlen, Carl Hanser-Verlag, Munich, 1966, pages 103 to 113.

The quantity of polyisocyanate (component (a)) used in the process according to the present invention is preferably calculated so that the foamable mixture has an isocyanate index of from 70 to 130, in particular from 90 to 110. By "isocyanate index" is meant the quotient of the number of isocyanate groups and number of groups which are reactive with isocyanates multiplied by 100.

The known reaction injection molding technique (RIM process) is used for carrying out the process according to the present invention. The quantity of reaction mixture (which is optionally foamable) introduced into the mold is chosen so that the molded article generally has a density of from 0.8 to 1.2 g/cc, preferably from 0.9 to 1.1 g/cc.

A starting temperature of from 10° to 50° C., preferably from 20° to 30° C., is chosen for the mixture introduced into the mold. The temperature of the mold itself is generally from 40° to 100° C., and preferably from 50° to 70° C.

Although the very rapid reaction between the components renders the use of mold release agents superfluous, e.g. for removal of the molded product from polished metal molds, the known mold release agents based on wax or silicone may be used if desired. Furthermore, when carrying out the process according to the present invention, the internal mold release agents known in the art, such as those described, for example, in German Offenlegungsschriften No. 1,953,637 and 2,121,670, may also be used.

The moldings obtainable by the process according to the present invention are particularly suitable for the manufacture of flexible car bumpers and car body elements. However, with suitable variation of the starting components and particularly if a relatively low proportion of diamine (c) is used, it is also possible to produce materials which have good abrasion resistance and high mechanical strength e.g. flexible polyurethane shoe soles.

The starting materials mentioned in the following examples are processed in a manner known in the art by means of so called high pressure dosing units: the components are delivered by special pumps (i.e., BOSCH-piston pumps, yielding high pressure of about 100–300 atmospheres) to a hydraulically forced mix head, where they are thoroughly mixed by countercurrent injection (HK-machines from Hennecke were used although equivalent types of machines are available from other manufacturers such as KRAUSS-MAFFEI, SIEMAG, CANNON).

For the mechanical tests, plates measuring 120×20×0.4 cm were prepared in a temperable steel plate mold. The mold was filled from the long side through a sprue gate.

The present invention is not restricted to the machines mentioned above, but the mixing apparatus used should have a high output capacity (more than 0.5 kg/sec., preferably 1 kg/sec. for a molded article weighing 1 kg.) so that the extremely reactive liquid reaction mixture may be introduced into the mold within the shortest possible time.

EXAMPLES

EXAMPLE 1

83.50 parts, by weight, of a polyether having OH number 28 obtained by addition of propylene oxide and subsequent addition of ethylene oxide to trimethylolpropane;

12.50 parts, by weight, of a mixture of 65 parts, by weight, of 1-methyl-3,5-diethylphenylene-2,4-diamine and 35 parts, by weight, of 1-methyl-3,5-diethylphenylene-2,6-diamine;

0.05 parts, by weight, of a complex of 1 mol of dibutyl tin dilaurate and 1 mol of 2,3-dimethyl-3,4,5,6-tetrahydropyrimidine; and 4.00 parts, by weight, of monofluorotrichloromethane; were combined to form a polyol component and were injected into a mold with 33.50 parts, by weight, of a reaction product of tripropylene glycol and 4,4'-diphenylmethane diisocyanate (23%, by weight, NCO).

The temperature of the raw materials was 25° C. and the temperature of the plate mold was adjusted to 50° C. The setting time in the mold was 30 seconds.

The polyurethane-polyurea elastomer obtained was tempered at 120° C. for one hour. The following mechanical properties were determined on the test plate (values obtained using an untempered plate are also shown for comparison).

|  |  | Tempered | Untempered |
|---|---|---|---|
| Density (kg/m$^3$) |  | 1062 | 1076 (DIN 53420) |
| Tensile strength (MPa) |  | 17.0 | 17.3 (DIN 53504) |
| Elongation at break (%) | +65° C. | 412 | 356 |
|  | RT | 391 | 374 (DIN 53504) |
|  | −30° C. | 307 | 258 |
| Tear propagation resistance without incision (kN/m) |  | 83 | 80 (DIN 53515) |
| Tensile strength at 50% elongation (MPa) |  | 5.04 | 5.28 (DIN 53504) |
| Shore A hardness |  | 93 | 94 (DIN 53505) |
| E-modulus, dynam. (MPa) (after Roelig) | +65° C. | 59.6 | 64.2 |
|  | RT | 90.8 | 101 |
|  | −30° C. | 243 | 309 |

EXAMPLE 2

100.00 parts, by weight, of the polyol mixture from Example 1 were processed with 24.00 parts, by weight, of a mixture of two polyisocyanates having an isocyanate content of 32.5%, by weight. The mixture of polyisocyanates has the following composition:

30.00 parts, by weight, of a partially carbodiimized 4,4'-diphenylmethane diisocyanate having an isocyanate content of 30%, by weight, and 70.00 parts, by weight, of pure 4,4'-diphenylmethane diisocyanate.

The processing conditions employed were the same as in Example 1. The following mechanical properties were then determined on the test plate:

| Density (kg/m$^3$) |  | 1015 |
|---|---|---|
| Tensile strength (MPa) |  | 12.5 |
| Elongation at break (%) | +65° C. | 439 |
|  | RT | 399 |
|  | −30° C. | 364 |
| Tear propagation resistance without incision (kN/m) |  | 60 |
| Tensile strength at 50% elongation (MPa) |  | 3.3 |
| Shore A hardness |  | 84 |
| E-modulus (MPa) | +65° C. | 36.9 |
|  | RT | 48.7 |
|  | −30° C. | 113 |

EXAMPLE 3

77.00 parts, by weight, of a polyether having OH number 28 which had been obtained by addition of propylene oxide followed by addition of ethylene oxide to trimethylol propane;

23.00 parts, by weight, of a mixture of 65 parts, by weight, of 1-methyl-3,5-diethyl-phenylenediamine-(2,4) and 35 parts of 1-methyl-3,5-diethyl-phenylenediamine-(2,6); and 0.10 parts, by weight, of dibutyl tin dilaurate; were combined to form a polyol component which was then injected into the mold with 55.00 parts, by weight, of a reaction product of tripropylene glycol and 4,4'-diphenylmethane diisocyanate (23% by weight, NCO). The processing conditions employed were the same as in Example 1. The following mechanical properties were determined on the test plate:

| Density (kg/m$^3$) |  | 1091 |
|---|---|---|
| Tensile strength (MPa) |  | 31.0 |
| Elongation at break (%) | +65° C. | 316 |
|  | RT | 290 |
|  | −30° C. | 222 |
| Tear propagation resistance without incision (kN/m) |  | 155 |
| Tensile strength at 50% elongation (MPa) |  | 15.4 |
| Shore D hardness |  | 62 |
| E-modulus (MPa) | +65° C. | 283 |
|  | RT | 449 |
|  | −30° C. | 977 |

EXAMPLE 4

83.50 parts, by weight, of a polymer polyol having OH number 28 which had been prepared by graft copolymerization of 20 parts, by weight, of styrene/acrylonitrile (proportion, by weight, 40:60) in 80 parts, by weight, of a propylene oxide-ethylene oxide mixed polyether (OH number 34) which had been started on trimethylolpropane;

12.50 parts, by weight, of a mixture of 65 parts, by weight, of 1-methyl-3,5-diethyl-phenylenediamine-(2,4) and 35 parts, by weight, of 1-methyl-3,5-diethyl-phenylene diamine-(2,6);

0.05 parts, by weight, of a complex of 1 mol of dibutyl tin dilaurate and 1 mol of 2,3-dimethyl-3,4,5,6-tetrahydropyrimidine; and 4.00 parts, by weight, of monofluorotrichloromethane; are combined to form a polyol component and injected into the mold with 33.50 parts, by weight, of a reaction product of tripropylene glycol and 4,4'-diphenylmethane diisocyanate which had an isocyanate content of 23%, by weight.

The same processing conditions were chosen as in Example 1. The following mechanical properties were determined on the test plate:

| | | |
|---|---|---|
| Density (kg/m$^3$) | | 1009 |
| Tensile strength (MPa) | | 14.6 |
| Elongation at break (%) | +65° C. | 379 |
| | RT | 369 |
| | −30° C. | 202 |
| Tear propagation resistance without incision (kN/m) | | 71 |
| Tensile strength at 50% elongation (MPa) | | 5.4 |
| Shore A hardness | | 92 |
| E-modulus (MPa) | +65° C. | 62 |
| | RT | 129 |
| | −30° C. | 516 |

EXAMPLE 5

100.00 parts, by weight, of the polyol mixture from Example 3 were processed with 41.00 parts, by weight, of a polyisocyanate which had been obtained by phosgenating aniline-formaldehyde condensates and which had a viscosity of 320 cP at 25° C. and an isocyanate content of 31.5%, by weight. The processing conditions employed were the same as in Example 1. The polyurethane-polyurea-elastomer obtained was tempered at 120° C. for one hour. The following mechanical properties were then determined on the test plate:

| | | |
|---|---|---|
| Density (Kg/m$^3$) | | 1048 |
| Tensile strength (MPa) | | 18.1 |
| Elongation at break (%) | +65° C. | 174 |
| | RT | 210 |
| | −30° C. | 159 |
| Tear propagation resistance without incision (kN/m) | | 90 |
| Tensile strength at 50% elongation (MPa) | +65° C. | 9.07 |
| | RT | 11.8 |
| | −30° C. | 20.3 |
| Shore D hardness | | 56 |

EXAMPLE 6

60.00 parts, by weight, of a polyether having OH number 28 which had been obtained by addition of propylene oxide followed by addition of ethylene oxide to propylene glycol;

17.00 parts, by weight, of a polyether having OH number 35 which had been obtained by addition of propylene oxide followed by addition of ethylene oxide to trimethylol propane;

23.00 parts, by weight, of a mixture of 65 parts, by weight, of 1-methyl-3,5-diethylphenylenediamine-(2,4) and 35 parts, by weight, of 1-methyl-3,5-diethyl-phenylenediamine-(2,6); and 0.60 parts, by weight, of 1,4-diaza-bicyclo-(2,2,2)-octane;

were combined to form a polyol component and injected into the mold with 45.50 parts, by weight, of a polyisocyanate which had been obtained by phosgenation of aniline-formaldehyde condensates followed by reaction with a polypropylene glycol having an OH number of 580, which polyisocyanate had a viscosity at 25° C. of 430 cP and an isocyanate content of 28%, by weight.

The processing conditions employed were the same as in Example 1. The polyurethane-polyurea elastomer obtained was tempered at 120° C. for one hour. The following mechanical properties were then determined on the test plate:

| | | |
|---|---|---|
| Density (kg/m$^3$) | | 1087 |
| Tensile strength (MPa) | | 21.9 |
| Elongation at break (%) | +65° C. | 249 |
| | RT | 313 |
| | −30° C. | 188 |
| Tear propagation resistance without incision (kN/m) | | 110 |
| Tensile strength at 50% elongation (MPa) | +65° C. | 9.62 |
| | RT | 12.5 |
| | −30° C. | 22.2 |
| Shore D hardness | | 61 |

EXAMPLE 7

77.00 parts, by weight, of a polymer polyol having OH number 28 prepared by graft polymerization of styrene and acrylonitrile (proportions, by weight 40:60) on a poly-(oxypropylene)triol having a molecular weight of 4800;

23.00 parts, by weight, of a mixture of 65 parts, by weight, of 1-methyl-3,5-diethyl-phenylenediamine-(2,4) and 35 parts of 1-methyl-3,5-diethyl-phenylenediamine-(2,6); and 0.20 parts, by weight, of a complex of 1 mol of dibutyl tin dilaurate and 1 mol of 2,3-dimethyl-3,4,5,6-tetrahydropyrimidine; were combined to form a polyol component which was injected into the mold with 55.00 parts, by weight, of a reaction product of tripropylene glycol and 4,4'-diphenylmethane diisocyanate (isocyanate content 23%).

The processing conditions employed were the same as in Example 1. The very rigid polyurethane-polyurea elastomer obtained was tempered at 120° C. for one hour. The following mechanical properties were then determined on the test plate:

| | | |
|---|---|---|
| Density (kg/cm$^3$) | | 1105 |
| Tensile strength (MPa) | | 38 |
| Elongation at break (%) | +65° C. | 329 |
| | RT | 329 |
| | −30° C. | ∼108 |
| Tear propagation resistance without incision (kN/m) | | 163 |
| Tensile strength at 50% elongation (MPa) | +65° C. | 13.4 |
| | RT | 19.0 |
| | −30° C. | 44.5 |
| Shore D hardness | | 68 |

EXAMPLE 8

9.50 parts, by weight, of 2,4-diamino-toluene were dissolved at 60° C. in 90.40 parts, by weight, of a polyether having OH number 28 which had been obtained by addition of propylene oxide followed by addition of ethylene oxide to trimethylol propane and the solution was combined with 0.10 parts, by weight, of a complex of 1 mol of dibutyl tin dilaurate and 1 mol of 2,3-dimethyl-3,4,5,6-tetrahydropyrimidine to form a polyol component which was injected into the mold with 23.60 parts, by weight, of a reaction product of tripropylene glycol and 4,4'-diphenylmethane diisocyanate (23%, by weight, NCO).

The temperature of the raw materials was 30° C. and the temperature of the mold was adjusted to 50° C. The setting time in the mold was 30 seconds.

The polyurethane polyurea elastomer obtained was tempered at 120° C. for one hour. The following mechanical properties were determined on the test plate:

| | | |
|---|---|---|
| Density (kg/m$^3$) | | 1102 |
| Tensile strength (MPa) | | 16.9 |
| Elongation at break (%) | +65° C. | 332 |
| | RT | 381 |
| | −30° C. | 315 |
| Tear propagation resistance without incision (kN/m) | | 75 |
| Tensile strength at 50% elongation | +65° C. | 2.61 |
| | RT | 3.45 |
| | −30° C. | 8.41 |
| Shore A hardness | | 84 |

The polyol component of Example 8 used only a very small amount of TDA. Even so, it was found to be unstable when stored at 25° C. The polyol component could be processed if it was maintained above 25° C., however, due to the extremely high reactivity of the diamine the reactive mixture was not pourable for a sufficient period of time to fill large molds as used i.e., for the manufacture of automobile bumpers. Due to the high reactivity only very small molds could be filled.

Example 8A prepared the reactive mixture of Example 8 at 25° C. A laboratory stirrer was used because it simulates the time delay of a large mold in a RIM process. The viscosity increase of the mixture was so sharp during the mixing operation that the mixture could not be poured into a mold.

Tolylene diamine is therefore not a suitable chain extender for the manufacture of large moldings such as automobile bumpers when used alone. Furthermore, this diamine has only a very limited compatibility, or miscibility, with polyether polyols so that it can only be used in relatively small quantities such as those used in Example 8. Even if small quantities are used care must be taken that the chain extender does not crystallize. Also, the temperature must be maintained above 25° C., such as the temperatures used in Example 8.

EXAMPLE 8A (Comparison Example—TDA)

83.50 pbw of a polyether with an OH number of 28, which was produced by adding propyleneoxide and subsequently adding ethyleneoxide to trimethylolpropane, 8.50 pbw 2,4-diaminotoluene (0.07 mol)

0.05 pbw of a complex of 1 mol dibutyltinlaurate and 1 mol 2,3-dimethyl-3,4,5,6-tetrahydropyrimidine and 4.00 pbw monofluorotrichloromethane were combined and mixed with 33.50 pbw of a reaction product from tripropyleneglycol and 4,4'-diphenylmethanediisocyanate (23 weight-% NCO) in a laboratory high-speed stirrer for approximately 4 seconds. A very rapid viscosity increase occurred with subsequent immediate hardening. It was not possible to "pour" the mixture.

EXAMPLE 9 (Comparison Example—DMTA)

83.50 pbw of a polyether having an OH number of 28, which was produced by adding propyleneoxide and subsequent addition of ethyleneoxide to trimethylolpropane.

10.50 pbw 2,4-diaminomesitylene (0.07 mol)

0.05 pbw of a complex of 1 mol dibutyltindilaurate and 1 mol 2,3-dimethyl-3,4,5,6-tretahydropyrimidine and 4.00 pbw monofluorotrichloromethane were combined to a polycomponent and mixed with 33.50 pbw of a reaction product of tripropyleneglycol and 4,4'-diphenylmethanediisocyanate (23 weight-% NCO) by a laboratory high-speed mixer for approx. 4 seconds.

A very rapid viscosity increase occurred—as in Example 8A—with subsequent immediate hardening. The mixture could no longer be "poured".

EXAMPLE 10 (Comparison Example—Desmodur T80 (TDI) as isocyanate component was processed according to the RIM-process)

77.00 pbw of a polyether having an OH number of 28, which was produced by adding propyleneoxide and subsequently adding ethyleneoxide to trimethylolpropane;

23.00 pbw of a mixture of 65 pbw 1-methyl-3,5-diethylphenylenediamine-(2,4) and 35 pbw 1-methyl-3,5-diethylphenylenediamine-(2,6) and 0.25 pbw of a complex of 1 mol dibutyltindilaurate and 1 mol 2,3-dimethyl-3,4,5,6-tetrahydropyridine were combined to a polycomponent and processed according to the RIM process with 26.00 pbw of a mixture of 80 weight-% 2,4-tolylenediisocyanate and 20 weight-% 2,6-tolylenediisocyanate. The temperature of the raw materials was 34° C., the temperature of the mold (120×20×0.4 cm, Constructal 20/52) was 80° C.

The mold release of the test plate was possible only after 5 minutes. As short demolding times (30 seconds) the test plates have insufficient strengths.

After tempering (45 minutes at 120° C.), the following mechanical values were measured on the test plate:

| | | | | |
|---|---|---|---|---|
| Density | (kg/m$^3$) | | 892 | (DIN 53420) |
| Tensile strength | (MPa) | | 10.8 | (DIN 53504) |
| Ultimate elongation | (%) | +65° C. | 416 | (DIN 53504) |
| | | RT | >440 | |
| | | −30° C. | 305 | |
| Tear strength, split | (kN/m) | | 32.8 | (DIN 53515) |
| Tensile stress at 50% elongation | (MPa) | | 4.58 | (DIN 53504) |
| Shore-D-hardness | | | 35 | (DIN 53505) |
| Flexural modulus | (MPa) | | 88 | (ASTM-D790) |
| Modulus of elasticity | (MPa) | +65° C. | 98.7 | |

-continued

| | | |
|---|---|---|
| Dynamic (acc. to Roelig) | RT | 122 |
| | −30° C. | 211 |

EXAMPLE 11 (Comparison Example—MOCA)

The polyol component of Example 1 was modified by replacement of the 12.50 parts by weight of the diamine mixture by 18.7 parts by weight of 3,3'-dichloro-4,4'-diamino diphenylmethane (MOCA) which is an equivalent quantity. The thus modified polyol component was admixed at room temperature with 33.5 parts by weight of the isocyanate component of Example 1. The mixing operation was carried out at room temperature with the aid of a fast laboratory stirrer for a period of time of 4 sec. The reaction mixture remained liquid for at least 60 sec. When the mixture was poured into an aluminum mold it could only be demolded after 15 min. The part remained tacky for 10 min.

EXAMPLE 12 (Comparison Example—TDI)

The polyol component of Example 1 was mixed at room temperature with 16 parts by weight of a mixture consisting of 80 parts by weight of 2,4-diisocyanato toluene and 20 parts by weight of 2,6-diisocyanato toluene which is the equivalent quantity compared to the 33.5 parts by weight of the isocyanate component of Example 1. The components were mixed with the aid of a fast laboratory stirrer at room temperature for a period of time of 4 sec. The reaction mixture was pourable for 2 sec. It was poured into an aluminum mold. The molding could be demolded only after 5 minutes. It had a wax-like brittle consistency. The molding obtained had no "green strength".

EXAMPLE 13 (Comparison Example—MOCA/TDI)

The polyol component of Example 11 was combined with the polyisocyanate component of Example 12 with the aid of a fast laboratory stirrer at room temperature.

The mixture remained thinly liquid for about 1 min. A plate obtained in an aluminum mold could be demolded only after 30 min. The part remained tacky for 20 min.

We claim:

1. In a process for the production of polyurethane elastomer moldings having a compact surface skin from a reaction mixture by a reaction injection molding process, wherein said reaction mixture comprises the following components:
   (a) 4,4'-diisocyanatodiphenylmethane, polyisocyanates based on 4,4'-diisocyanatodiphenylmethane or mixtures thereof;
   (b) hydroxyl group containing compounds having molecular weights of from 1800 to 12,000;
   (c) a chain extender; and
   (d) a catalyst for the reaction between hydroxyl groups and isocyanate groups;
the improvement wherein said chain extender is miscible with component (b) in any proportion and is an active aromatic diamine having alkyl groups of from 1 to 3 carbon atoms in the ortho-positions to each amino group, and wherein said components are processed via the one-shot process whereby (a) is mixed simultaneously either with (b), (c), and (d) or with a non-reacted premixture of some or all of (b), (c), and (d) or with a non-reacted premixture of some or all of (b), (c) and (d), with the proviso that at least two of said alkyl substituents contain 2 or 3 carbon atoms.

2. The process of claim 1, wherein the reaction mixture also contains a blowing agent and wherein said moldings are further characterized as having a cellular core.

3. The process of claim 1, wherein said chain extender contains at least one linear alkyl substituent in the ortho-position to a first amino group and two linear alkyl substituents in the ortho-position to a second amino group, and wherein said chain extender is either in liquid form or is dissolved in said hydroxyl group containing compound.

4. The process of claim 1, wherein said chain extender is selected from the group consisting of 1-methyl-3,5-diethyl-2,4-diamino benzene; 1-methyl-3,5-diethyl-2,6-diamino benzene; 1,3,5-triethyl-2,6-diamino benzene; 3,5,3',5'-tetraethyl-4,4'-diaminodiphenyl methane; and mixtures thereof.

5. The process of claim 4, wherein said chain extender is selected from the group consisting of 1-methyl-3,5-diethyl-2,4-diamino benzene; 1-methyl-3,5-diethyl-2,6-diaminobenzene; and mixtures thereof.

6. The process of claim 1, wherein
   (i) component (c) comprises from 5 to 50 percent by weight based on the total weight of component (b);
   (ii) component (d) comprises from 0.01 to 10 percent by weight based on the total weight of component (b); and
   (iii) the amount of component (a) is such that said reaction mixture has an isocyanate index of from 70 to 130.

7. The process of claim 6, wherein
   (i) component (c) comprises from 5 to 35 percent by weight based on the total weight of component (b);
   (ii) component (d) comprises from 0.05 to 1 percent by weight based on the total weight of component (b); and
   (iii) the amount of component (a) is such that said reaction mixture has an isocyanate index of 8. The process of claim 1, wherein said hydroxyl group containing compound is selected from the group consisting of polyethers, polyesters, polythioethers, polyacetals, polycarbonates, polyester amides and mixtures thereof.

9. The process of claim 1, wherein said hydroxyl group containing compound is a polyhydroxyl polyether having at least two hydroxyl groups.

10. The process of claim 9, wherein said polyether has a molecular weight of from 3,000 to 7,000 and contains 3 hydroxyl groups.

11. The process of claim 1, wherein said catalyst is selected such that said reaction mixture has a flow time of less than 15 seconds.

12. The process of claim 11, wherein said catalyst is selected such that said reaction mixture has a flow time of less than 10 seconds.

13. The process of claim 12, wherein said catalyst is selected such that said reaction mixture has a flow time of less than 5 seconds.

14. The process of claim 1, wherein said polyisocyanates based on 4,4'-diisocyanatodiphenylmethane are liquid at room temperature.

15. An active hydrogen containing blend for use in the production of polyurethane moldings comprising:

(a) an organic hydroxyl group containing compound having a molecular weight of from 1,800 to 12,000, and (b) a chain extender which is miscible with polyhydroxyl compounds in any proportion and is selected from the group consisting of active aromatic diamines, having alkyl groups of from 1 to 3 carbon atoms in the ortho-position to each amino group, with the proviso that at least two of said alkyl substituents contain 2 or 3 carbon atoms.

16. The composition of claim 15, wherein said blend also contains a catalyst for reaction between hydroxyl groups and isocyanate groups.

17. The composition of claim 15, wherein said chain extender contains at least one linear alkyl substituent in the ortho-position to a first amino group and two linear alkyl substituents in the ortho-position to a second amino group.

18. The composition of claim 15, wherein said chain extender is selected from the group consisting of 1-methyl-3,5-diethyl-2,4-diamino benzene; 1-methyl-3,5-diethyl-2,6-diamino benzene; 1,3,5-triethyl-2,6-diamino benzene; 3,5,3',5'-tetraethyl-4,4'-diaminodiphenyl methane; and mixtures thereof.

19. The composition of claim 18, wherein said chain extender is selected from the group consisting of 1-methyl-3,5-diethyl-2,4-diaminobenzene, 1-methyl-3,5-diethyl-2,6-diaminobenzene, and mixtures thereof.

20. The composition of claim 15, wherein said chain extender comprises from 5 to 50 percent by weight based on the total weight of said hydroxyl group containing compound.

21. The composition of claim 20, wherein said chain extender comprises from 5 to 35 percent by weight based on the total weight of said hydroxyl group containing compound.

22. The composition of claim 15, wherein said polyhydroxyl compound is selected from the group consisting of polyethers, polyesters, polythioethers, polyacetals, polycarbonates, polyester amides and mixtures thereof.

23. The composition of claim 15, wherein said hydroxyl group containing compound is a polyhydroxyl polyether having at least two hydroxyl groups.

24. The composition of claim 23, wherein said polyether has a molecular weight of from 3,000 to 7,000 and contains 3 hydroxyl groups.

25. In a process for the production of polyurethane elastomer moldings having a compact surface from a reaction mixture by a reaction injection molding process, wherein said reaction mixture comprises the following components:
(a) 4,4'-diisocyanatodiphenylmethane, polyisocyanates based on 4,4'-diisocyanatodiphenylmethane or mixtures thereof;
(b) hydroxyl group containing compounds;
(c) a chain extender; and
(d) a catalyst for the reaction between hydroxyl groups and isocyanate groups;
the improvement wherein said chain extender is miscible with polyhydroxyl compounds in any proportion and is selected from the group consisting of active aromatic diamines, which contain at least one alkyl substituent in the ortho-position to a first amino group and two alkyl substituents in the ortho-position to a second amino group, or mixtures thereof, with the proviso that at least two of said alkyl substituents contain at least two carbon atoms, and where said components (a), (b), (c) and (d) are processed via the one-shot process whereby (a) is mixed simultaneously either with (b), (c) and (d) or with a non-reacted premixture of some or all of (b), (c), and (d).

26. The process of claim 25, wherein said reaction mixture contains no blowing agent.

27. The process of claim 26, wherein said chain extender is selected from the group consisting of 1-methyl-3,5-diethyl-2,4-diamino benzene; 1-methyl-3,5-diethyl-2,6-diamino-benzene; and mixtures thereof.

28. The process of claim 25, wherein said reaction mixture also contains a blowing agent and wherein said moldings are further characterized as having a cellular core.

29. The process of claim 25, wherein said chain extender has linear alkyl substituents of 2 or 3 carbon atoms in both ortho-positions to each amino group.

30. The process of claim 29, wherein said chain extender is either in liquid form or is dissolved in said hydroxyl group containing compound.

31. The process of claim 25, wherein said polyisocyanates based on 4,4'-diisocyanatodiphenylmethane are liquid at room temperature.

32. The process of claim 25, wherein
(i) component (c) comprises from 5 to 50 percent by weight based on the total weight of component (b);
(ii) component (d) comprises from 0.01 to 10 percent by weight based on the total weight of component (b); and
(iii) the amount of component (a) is such that said reaction mixture has an isocyanate index of from 70 to 130.

33. The process of claim 32, wherein
(i) component (c) comprises from 5 to 35 percent by weight based on the total weight of component (b);
(ii) component (d) comprises from 0.05 to 1 percent by weight based on the total weight of component (b); and
(iii) the amount of component (a) is such that said reaction mixture has an isocyanate index of from 90 to 110.

34. The process of claim 25, wherein said hydroxyl group containing compound is selected from the group consisting of polyethers, polyesters, polythioethers, polyacetals, polycarbonates, polyester amides and mixtures thereof.

35. The process of claim 25, wherein said hydroxyl group containing compound has a molecular weight of from 1,800 to 12,000 and has at least two hydroxyl groups.

36. The process of claim 35, wherein said hydroxyl group containing compound is a polyhydroxyl polyether and has a molecular weight of from 3000 to 7000 and contains 3 hydroxyl groups.

37. The process of claim 25, wherein said catalyst is selected such that said reaction mixture has a flow time of less than 15 seconds.

38. The process of claim 37, wherein said catalyst is selected such that said reaction mixture has a flow time of less than 10 seconds.

39. The process of claim 38, wherein said catalyst is selected such that said reaction mixture has a flow time of less than 5 seconds.

40. An active hydrogen containing blend for use in the production of polyurethane moldings comprising:
(A) an organic hydroxyl group containing compound, and (B) from 5 to 50 percent by weight based on the weight of (A) of a chain extender which is miscible with polyhydroxyl compounds in any proportion and is selected from the group consisting of aromatic diamines which contain at least one alkyl substituent in the ortho-position to a first amino group and two alkyl substituents in the ortho-position to a second amino group or mixtures thereof, with the proviso that at least two of said alkyl substituents contain at least two carbon atoms.

41. The composition of claim 40, wherein said blend also contains a catalyst for reaction between hydroxyl groups and isocyanate groups.

42. The composition of claim 40, wherein said chain extender comprises from 5 to 35 percent by weight based on the total weight of said hydroxyl group containing compound.

43. The composition of claim 40, wherein said polyhydroxyl compound is selected from the group consisting of polyethers, polyesters, polythioethers, polyacetals, polycarbonates, polyester amides and mixtures thereof.

44. The composition of claim 40, wherein said polyhydroxyl group containing compound has a molecular weight of from 1,800 to 12,000.

45. The composition of claim 44, wherein said hydroxyl group containing compound is a polyhydroxyl polyether having at least two hydroxyl groups.

46. The composition of claim 45, wherein said polyether has a molecular weight of from 3,000 to 7,000 and contains 3 hydroxyl groups.

* * * * *

UNITED STATES PATENT AND TRADEMARK OFFICE
CERTIFICATE OF CORRECTION

PATENT NO. : 4,218,543
DATED : August 19, 1980
INVENTOR(S) : Christian Weber and Hermann Schäfer It is certified that error appears in the above—identified patent and that said Letters Patent is hereby corrected as shown below:

At column 20, line 43 add the following after "of"

--from 90 to 110--.

Signed and Sealed this

Twenty-eighth Day of May 1985

[SEAL]

Attest:

DONALD J. QUIGG

Attesting Officer     Acting Commissioner of Patents and Trademarks